United States Patent
Honegger et al.

(10) Patent No.: US 11,384,783 B2
(45) Date of Patent: Jul. 12, 2022

(54) CHIP BREAK BOLT HEAD

(71) Applicant: ALLFAST FASTENING SYSTEMS, City of Industry, CA (US)

(72) Inventors: Omar Honegger, Covina, CA (US); Bob Flores, City Of Industry, CA (US); Paul Keller, City Of Industry, CA (US)

(73) Assignee: ALLFAST FASTENING SYSTEMS, City of Industry, CA (US)

( * ) Notice: Subject to any disclaimer, the term of this patent is extended or adjusted under 35 U.S.C. 154(b) by 114 days.

(21) Appl. No.: 16/171,421

(22) Filed: Oct. 26, 2018

(65) Prior Publication Data

US 2019/0128306 A1  May 2, 2019

Related U.S. Application Data

(60) Provisional application No. 62/579,470, filed on Oct. 31, 2017.

(51) Int. Cl.
| | | |
|---|---|---|
| *F16B 19/05* | (2006.01) | |
| *B21J 15/02* | (2006.01) | |
| *F16B 19/10* | (2006.01) | |

(52) U.S. Cl.
CPC ............. *F16B 19/05* (2013.01); *B21J 15/022* (2013.01); *F16B 19/109* (2013.01)

(58) Field of Classification Search
CPC ........ F16B 19/05; F16B 19/08; F16B 19/109; F16B 23/0061; B21J 15/40; B21J 15/50; B21J 15/32; B21J 15/022
USPC ........................................................ 411/361
See application file for complete search history.

(56) References Cited

U.S. PATENT DOCUMENTS

| | | | | |
|---|---|---|---|---|
| 662,134 | A * | 11/1900 | Rodd | F16B 23/0061 411/405 |
| 2,180,633 | A * | 11/1939 | Holt | F16B 23/0007 411/405 |
| 2,959,999 | A | 11/1960 | Wing | |
| 3,657,956 | A * | 4/1972 | Bradley | F16B 19/1063 411/43 |
| 4,285,265 | A * | 8/1981 | Rieper | F16B 19/1054 411/34 |
| 4,480,514 | A * | 11/1984 | Ponziani | F16B 23/0061 81/176.15 |
| 4,757,596 | A * | 7/1988 | Herb | B21J 15/32 227/119 |
| 5,135,340 | A | 8/1992 | Stinson | |

(Continued)

FOREIGN PATENT DOCUMENTS

GB  472329  9/1937

OTHER PUBLICATIONS

International Searching Authority, European Patent Office, International Search Report and Written Opinion for PCT/US2018/057640, dated Feb. 22, 2019.

*Primary Examiner* — Roberta S Delisle
(74) *Attorney, Agent, or Firm* — McDonald Hopkins LLC

(57) ABSTRACT

Two piece tack rivets and method of forming holes for permanent fasteners. The tack rivets have a stem with a head on one end and a grooved region adjacent the other end, and a locking collar for fitting over the grooved region of the stem for deforming into the grooved region of the stem on applying a setting force between the locking collar and the stem. The head includes cutouts formed therein. The cutouts prevent the head from forming large chips or strips when drilled.

10 Claims, 5 Drawing Sheets

(56) References Cited

U.S. PATENT DOCUMENTS

| | | | |
|---|---|---|---|
| 5,689,873 A | 11/1997 | Luhm | |
| 5,762,457 A * | 6/1998 | Lide | B25B 13/065 |
| | | | 411/405 |
| 6,427,336 B1 * | 8/2002 | Kojima | B21J 15/50 |
| | | | 29/261 |
| 6,772,500 B2 | 8/2004 | Luhm | |
| 8,328,483 B2 | 12/2012 | Jones | |
| 8,366,363 B2 | 2/2013 | Jones | |
| 2004/0240963 A1 * | 12/2004 | Luhm | F16B 19/05 |
| | | | 411/383 |
| 2006/0165507 A1 * | 7/2006 | McEldowney | B21J 15/50 |
| | | | 411/34 |
| 2011/0314768 A1 * | 12/2011 | Johnson | F16B 12/14 |
| | | | 52/745.21 |
| 2012/0034045 A1 * | 2/2012 | Luhm | F16B 19/1045 |
| | | | 411/360 |
| 2013/0004263 A1 * | 1/2013 | Palmisano | B21J 15/50 |
| | | | 411/501 |
| 2015/0192161 A1 | 7/2015 | Makino | |
| 2019/0195260 A1 * | 6/2019 | Athas | F16B 19/1054 |

* cited by examiner

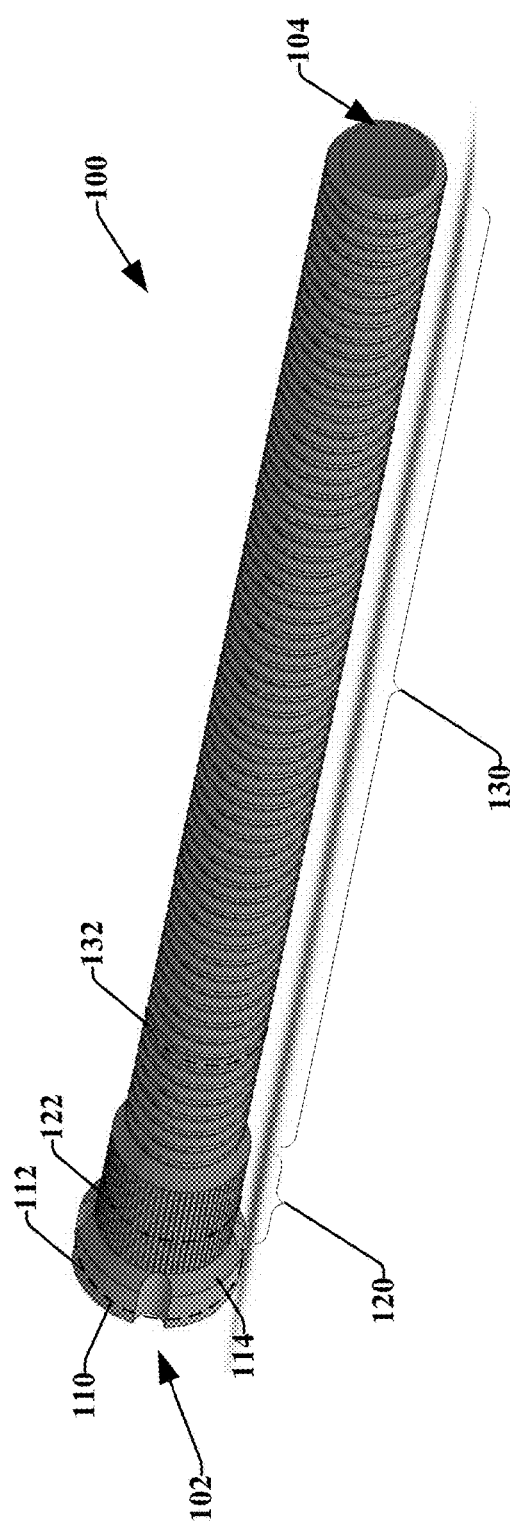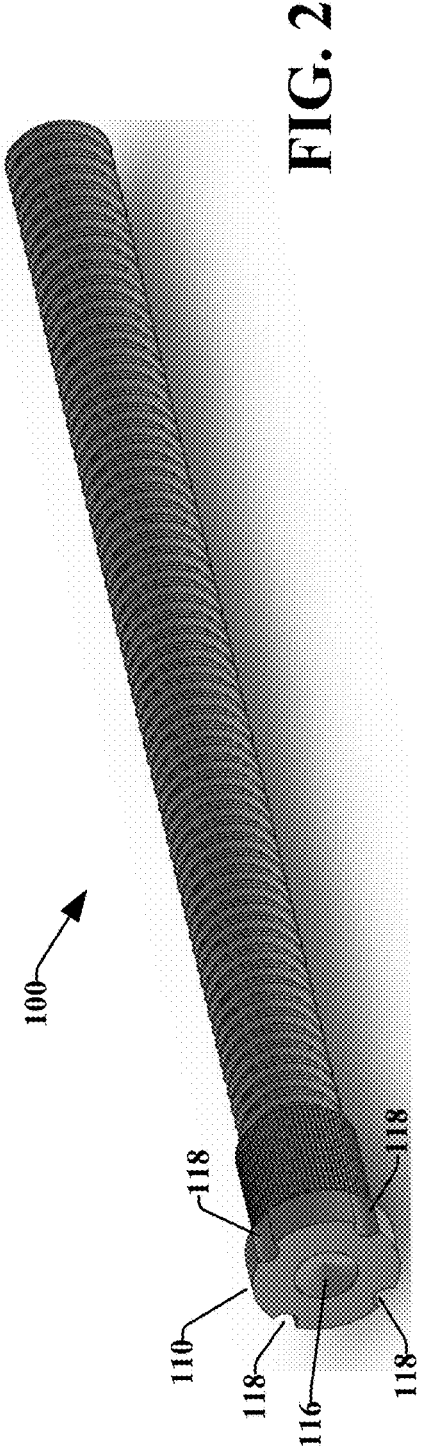

CHIP BREAK BOLT HEAD

CROSS-REFERENCE TO RELATED APPLICATION

This application claims priority to U.S. Provisional Patent Application No. 62/579,470 entitled "CHIP BREAK BOLT HEAD," filed on Oct. 31, 2017, which is incorporated herein by reference in its entirety.

FIELD OF INVENTION

The present invention relates to the field of temporary fasteners, as are typically used to hold workpieces together while permanent fasteners are installed.

BACKGROUND

Temporary fasteners are frequently used in manufacturing to hold workpieces

Temporary fasteners are frequently used in manufacturing to hold work pieces together while permanent fasteners are installed. Such fasteners are installed in a few holes in the work pieces to align and pull the parts together that are to be joined so that permanent fasteners may be installed in the remaining holes, after which the temporary fasteners are removed for installation of permanent fasteners in these holes also.

Ideal temporary fasteners may have various characteristics, depending on their application. In general, as previously mentioned, temporary fasteners are intended to align and pull the parts together so that permanent fasteners may be installed. Consequently, a temporary fastener should have the capability of pulling together work pieces that may initially have a substantial separation (commonly referred to as "sheet takeup"), so that the installer does not have to resort to other means to pull the work pieces together sufficiently to properly install the temporary fastener. Also, while the work pieces will not be subjected to the same loads they may encounter in use after the permanent fasteners are installed, the temporary fasteners typically will only be installed in a small percentage of the fastener holes in the work pieces, such as every tenth hole or so. This, plus a desired large and strong sheet takeup capability, makes temporary fastener strength an important parameter.

Other important parameters for temporary fasteners include low fastener cost, and ease of installation and removal. Simplicity of fastener design and assembly, together with a simple installation operation contributes to low cost and ease of operation, as does a large and strong sheet take-up capability. Removal of temporary fasteners varies with the fastener design, some fasteners being disassembled for removal and others being drilled out for removal. Drilling out of temporary fasteners is perfectly acceptable and may be a favored method of temporary fastener removal, provided the fastener is a low cost fastener and the drilling operation itself doesn't foster other complications.

In some applications, temporary fasteners must be installable and removable with access to only one side of the work pieces. Fasteners of this type, such as disclosed in U.S. Pat. No. 5,689,873 entitled "Tacking Fastener" and assigned to the assignee of the present invention, are referred to as blind temporary fasteners. The present invention is intended for use in applications where access to both sides of the work pieces is available.

Drilling of temporary fasteners often results in scratching or other damage to the work piece. Moreover, chips that break off of the fastener may lead to damage of the work piece, may fall into components, or may bind a drill bit. It would be beneficial to provide a fastener that does not break into large chips, reduces potential for damage to a work piece, and provides for more efficient fastening.

SUMMARY

The following presents a summary of this disclosure to provide a basic understanding of some aspects. This summary is not intended to identify key or critical elements or define any limitations of embodiments or claims. Furthermore, this summary may provide a simplified overview of some aspects that may be described in greater detail in other portions of this disclosure. A tacking fastener for forming a hole for a permanent fastener is shown and described. The tacking fastener comprises a stem comprising: a first end comprising a head; a second end; and a ribbed portion extending at least partially between the first end and the second end. The tacking fastener further comprises a collar operatively attachable to the ribbed portion; wherein the head comprises three or more cutouts formed therethrough. The cutouts are equally spaced apart from each other.

A method of creating a hole for a permanent fastener to fasten work pieces together as described. The method includes providing a tacking fastener for forming a hole for a permanent fastener, the tacking fastener comprising, a stem and a collar lockably engagable with the stem, the stem having a first end and a second end, the first end comprising a head, the head comprising a body and at least four cutouts formed therethrough; inserting the stem through one or more apertures of one or more workpieces; engaging the collar with the stem; and drilling the head of the stem with a drill bit that has a diameter larger than the head of the stem. The drill bit includes flutes sized and shaped such that shavings from the head do not clog the flutes.

A stem for a tacking fastener is described. The stem includes a head comprising a head body, the head body includes at least four apertures formed therethrough; an insert portion extending from the head; and a ribbed portion extending from the insert portion. The cutouts are generally cylindrical in shape or comprise at least one of a V-Shape, a U-shape, or a rectangular shape.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which:

FIG. 1 is a back, perspective view of a stem for a tacking rivet in accordance with embodiments disclosed herein;

FIG. 2 is a front, perspective view of the stem of FIG. 1 in accordance with embodiments disclosed herein;

DETAILED DESCRIPTION

Figure 3:
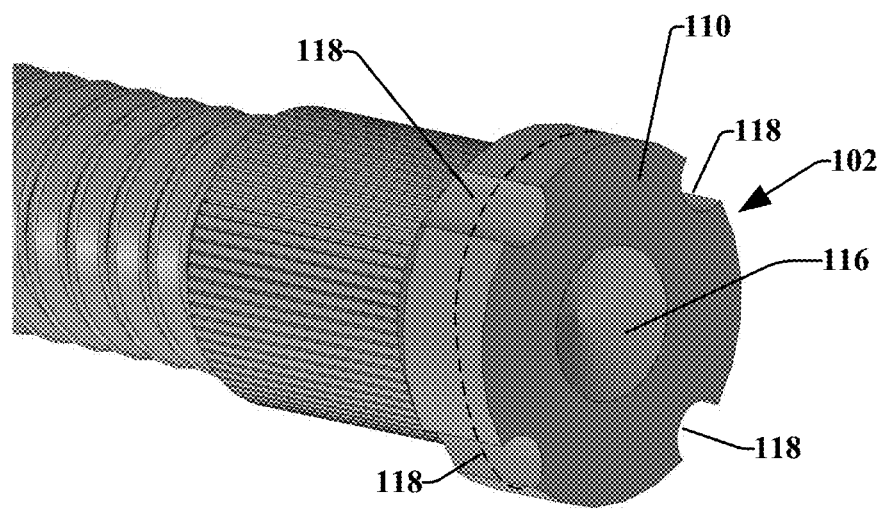
FIG. 3 is an enlarged front, perspective view of a portion of the stem of FIG. 1 in accordance with embodiments disclosed herein.

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

As used herein, terms such as "user," "operator," and the like are employed interchangeably throughout the subject specification, unless context suggests otherwise or warrants a particular distinction among the terms. It is noted that such terms may refer to human entities or automated components such as automated robotic assembly devices. Such devices may be controlled by a user, supported through artificial intelligence (e.g., a capacity to make inference), programmed for a particular user, or the like. For instance, examples describing a user drilling a tack rivet may include a human user with a hand held drill, a human operating a robotic arm having a drill, an automated machine that utilizes a drill, or the like.

Described embodiments generally refer to temporary tack rivets that may hold two work pieces together. An example of a prior tack rivet is described in U.S. Pat. No. 6,772,500 which is assigned to the present Applicant and incorporated by reference herein. Such rivets may be utilized in a variety of applications including, but not limited to, automotive applications and aerospace applications.

Tack rivets described herein may provide structural integrity to the work pieces. Moreover, the tack rivets may be drilled out and a permanent rivet or other fastener may be installed in the work pieces. Moreover, disclosed rivets may comprise various materials, such as aluminum alloys (e.g., 2017, 2117, 2024, 5056, 7050, 7075 aluminum alloy), other metals, plastics, or the like.

The disclosed tack rivets generally comprise a stem and a collar. The stem may be solid or hollow. Moreover, the stem may include a head on one end and a grooved region. The collar may fit over the grooved region of the stem and may be locked in place. As an example, the stem is positioned through a hole in a first work piece and a hole in a second work piece. The head comprises a ledge that is sized and shaped so that it does not pass through the holes. The other end of the stem may receive the locking collar. The locking collar may be slid up the stem and may be locked in place by a setting force. The rivet may be later drilled out with a drill head. The drill head may comprise a diameter that is larger than the diameter of the head.

The head of disclosed embodiments may include three or more recesses or cut-outs formed around the periphery of the head of the stem. In at least one aspect, the head includes four recesses that are spaced apart from each other. As the head is drilled, chip pieces from the head are removed by the drill bit. The recesses break up the chip sizes. The reduced chip sizes prevent or reduce the chances of scratching the work piece, binding flutes of a drill bit, or the like. It is noted that four cut-outs have been found to provide particularly desirable results even as opposed to heads with three cut-outs. Furthermore, four evenly spaced cut-outs prevent the head from coming apart in large sections, which may be particularly undesirable as such sections may bind a drill bit, scratch a work piece, become lost in a part, or otherwise provide negative effects.

Figure 7A:
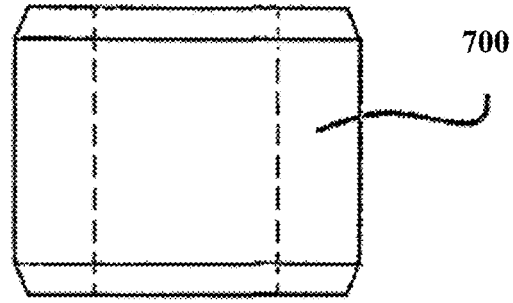
FIG. 7A is a side view of a collar in accordance with embodiments disclosed herein.
Figure 7B:
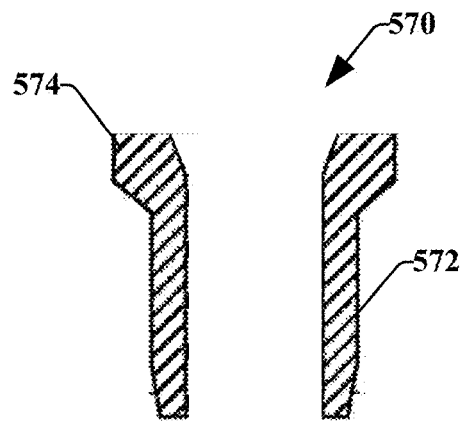
FIG. 7B is a side view of a collar as shown in FIG. 5, in accordance with embodiments disclosed herein.
Figure 8:
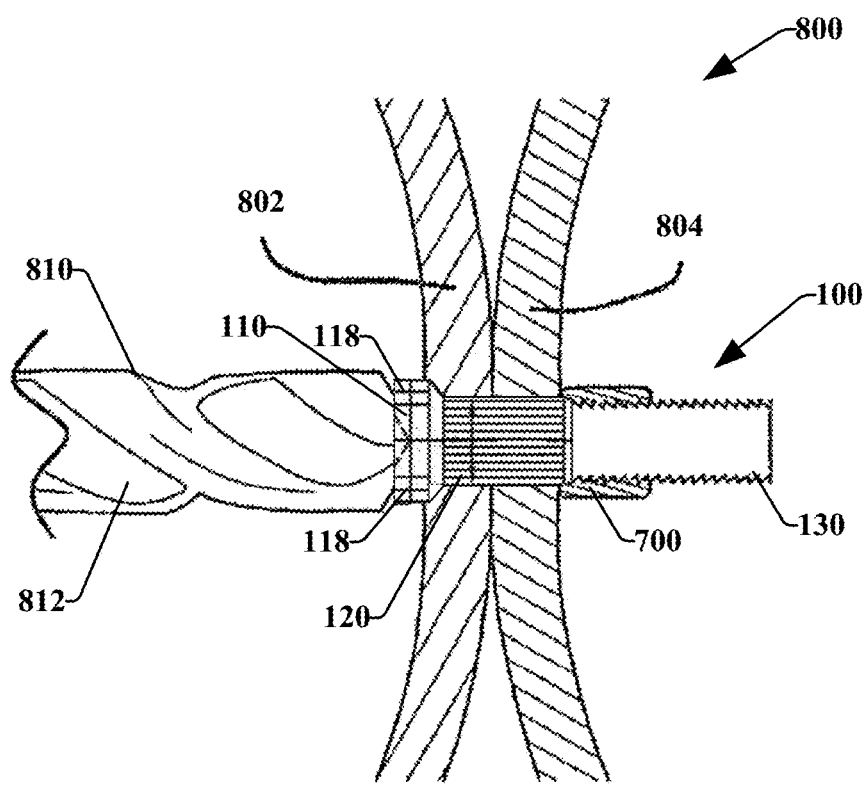
FIG. 8 is a side view of a tack rivet being drilled in accordance with embodiments disclosed herein.

Turning to FIGS. 1 and 2, there are different views of a stem 100 of a tack rivet in accordance with various disclosed embodiments. The stem 100 may be attachable with a collar 700 to fasten workpieces together, as depicted in FIGS. 7A and 8. In other embodiments a collar 570 (as shown in FIG. 7B) may be utilized. It is noted that the stem 100 may be generally cylindrical. In other examples, the stem may comprise other shapes.

The stem 100 generally includes a distal end 102 and a proximal end 104. The proximal end 104 may be inserted within bores of a workpiece. The distal end 102 may include a head 110. An insert portion 120 may extend from the head in the direction of the proximal end 104. A ribbed portion 130 may extend from the insert portion 120 to the proximal end 104. It is noted that the ribbed portion 130 may comprise a number of grooves or ridges that may include circular grooves that may be uniform in shape or may comprise differently sized grooves. In some embodiments, the ribbed portion 130 may be divided into sections with differently sized or shaped ribs. In at least one embodiment grooves may comprise a shape corresponding to that generally used for a blind rivet stem so that the same may be gripped for pulling with conventional blind rivet pulling heads. It is noted that other shapes may be utilized for ribbed portion 130.

The insert portion 120 may comprise a diameter 122 that is generally larger than the diameter 132 of the ribbed portion 130 and smaller than the diameter 112 of the head 110. As shown in FIG. 8, the insert portion 120 may be operatively inserted into an aperture formed through work pieces 802 and 804. While the stem 100 is inserted in the aperture, the insert portion 120 may provide structural support. As an exemplary embodiment, a two-piece tack rivet may comprise the stem 100 and collar 700. The work pieces 802 and 804 may comprise metal surfaces, or other materials such as composites (e.g., carbon fiber), that undergo stress during manufacturing, such as during manufacturing of curved work pieces of an aircraft fuselage. In this example, suitable materials for the stem 100 must be able to undergo stress and forces in such applications, such as high strength aluminum alloys (e.g., 7075, etc.). As noted, the increased diameter 112 of the head 110, in comparison with the diameter 122 of the insert portion 120, prevents the head 110 from passing through the aperture of the work pieces 802 and 804. The collar 700 is disposed on the opposite side of the insert 120 as the head 110. In operation, a user threads the proximal end 104 of the stem 102 through the aperture. The proximal end 104 may be tapered, frustoconical, or the like. The user then attaches the collar 700 to the ribbed portion 130 in an appropriate position. Next, the user applies a tightening force to secure the stem 100 and/or mechanically swage collar 700 in place. When appropriate, the user may drill out the stem 100 with a drill bit 810. The drill bit 810 includes flutes 812 formed therein. It is noted that drill bit 810 may comprise different sizes, shapes, and angles. In generally, the selection of the drill bit 810 may be based on the size of the head 110.

Figure 4:
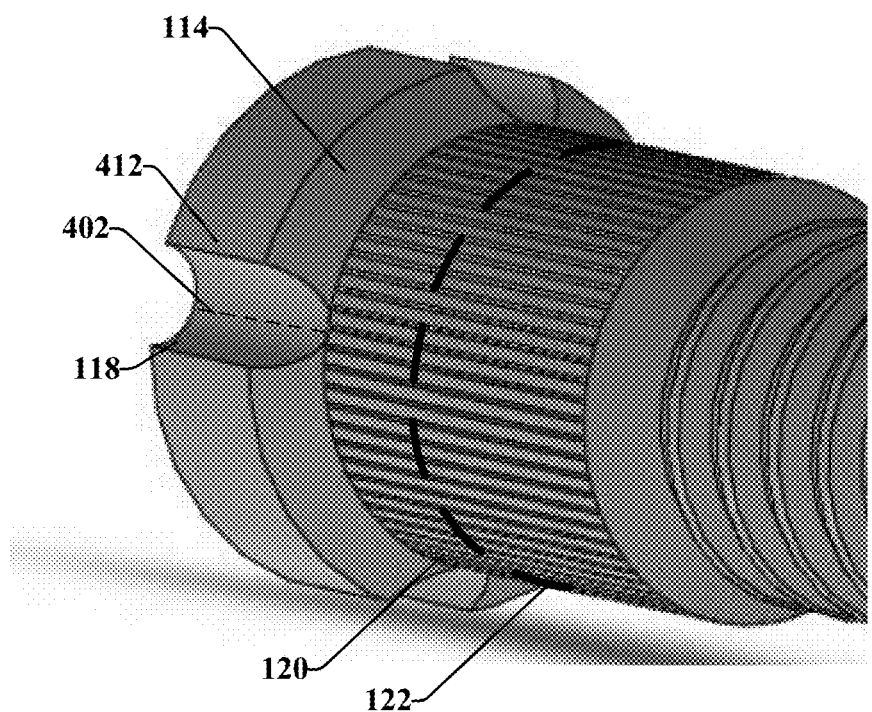
FIG. 4 is an enlarged back, perspective view of a portion of the stem of FIG. 1 in accordance with embodiments disclosed herein.

Turning to FIGS. 3-4, with reference to the other figures, there are enlarged views of a portion of stem 100. Head 110 includes cutouts 118 sized and shaped to prevent buildup of chips or prevent metal shavings from forming a wire. Head 110 may include an indent 116 that may receive and center the drill bit 810. The indent 116 may be curved, conical, or otherwise shaped to allow for ease of alignment of the drill bit 810.

In an example, in some traditional bolts, when a user drilled out the bolt heads, the metal shavings would form strips as they are cut by flutes of a drill. In other examples, the bolt head would chip into large pieces. These chips or strip-like shavings would scratch or otherwise damage a work piece. Such damage may occur when a stem 100 is made of a material having a hardness greater than the hardness of the work piece. This is particularly true for stems 100 comprising high strength materials, such as those used for fuselages, curved work pieces, and other applications. Embodiments disclosed herein reduce potential damaged and provide other benefits as will be apparent.

The cutouts 118 may comprise recesses formed in or through a body 412 of the head 110. In embodiments, the head 110 may comprise i cutouts, where i is a number (e.g., 3, 4, 5, 6, etc.). The cutouts 118 may be spaced apart from each other. In an example, the cutouts 118 may be evenly spaced or may be unevenly spaced about the diameter 112 of the head 110. It has been found that four evenly spaced apart cutouts 118 may provide particular advantages that may not be apparent. For instance, two or three cutouts may result in drill bit 810 creating large chips or causing the head to break into separate pieces that may damage a work piece. Further, increasing the number of cutouts 118 may increase cost and may result in head 110 becoming too weak to prevent head from passing through the aperture of the work piece at larger numbers of apertures.

Cutouts 118 may comprise a vertex 402 representing the deepest portion of the cutout relative the diameter 112 of the head. In an exemplary embodiment, vertex 402 may be generally coplanar with a plane normal to a portion of the diameter 122 of the insert 120. It is noted, however, that the depth of the vertex 402 may exceed the plane of the insert 120 and/or may be a lesser distance. The term "vertex" is utilized for simplicity of explanation to describe the deepest portion of the cutout 118. As such, the cutouts 118 may comprise various shapes, such as cylindrical, conical, n-sided prisms (where n is a number), or may be irregular in shape.

Head 110 may include a transition portion 114 proximal the insert 120. The transition portion 114 may be frustoconical, tapered, chamfered, convex, concave, or otherwise shaped to transition from the diameter 112 of the head to the diameter 122 of the insert 120. It is noted that the cutouts 118 may be formed through the body portion 412 and the transition portion 114. In at least one embodiment, the cutouts 118 may terminate at the transition portion 114 as the transition portion may be operatively positioned within an aperture of the work piece. It is noted, however, that some embodiments may not include a transition portion 114.

Figure 5:
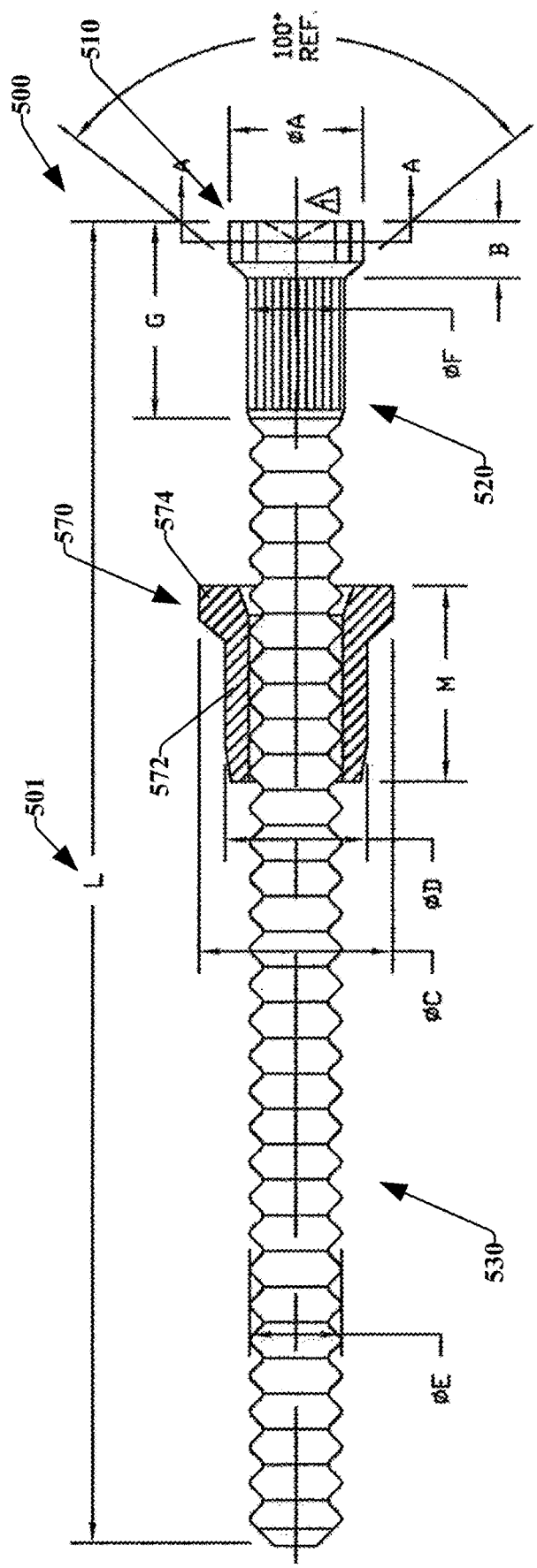
FIG. 5 is side view of a tack rivet including cutouts in a head of a stem in accordance with embodiments disclosed herein.
Figure 6:
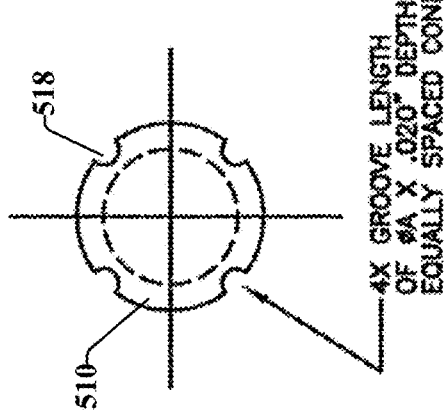
FIG. 6 is a top view of the head of the stem of FIG. 5 in accordance with embodiments disclosed herein.

Turning to FIGS. 5-6 there is a tack rivet 500 in accordance with various disclosed aspects. It is noted that the tack rivet 500 may primarily comprise stem 501 (which may include a head 510, insert portion 520, and ribbed portion 530) and a locking collar 570 (as also shown in FIG. 7B). Tack rivet 500 may include similar aspects as those described with reference to FIGS. 1-4 and 7-8. For example, stem 501 may comprise similar or identical aspects as stem 100, and collar 570 may comprise similar or identical aspects as collar 700. In another aspect, collar 570 may comprise a main body 572 and a flange 574 comprising a diameter generally larger than the diameter of the main body 572.

In an exemplary embodiment, the length L of the stem 501 may be approximately 2.5 in. The diameter ØA of head 510 may be generally 0.212-0.256 in., the head 510 height B may be generally 0.085-0.108. Diameter ØC of the flange 574 of the collar 570 may be generally between 0.320-0.385 in. The diameter ØD of the of the main body 572 may be generally 0.258-0.310 in. The length of the collar 570 may be generally 0.344-0.375 in. Diameter ØE of ribbed portion 530 may be generally 0.1715-0.1725 or 0.1970-0.2000 in. The length of the head 510 and insert portion 520 may be generally 0.250-0.360 in. In another aspect, the shear strength of the tack rivet 500 may be approximately 625-865, 875-1250 lbs./in$^2$ while the tensile strength is approximately 950-1650 lbs/in$^2$. The installation hole size may be 0.1645-0.1665 or 0.1900-0.1930 in. It is noted that the above measurements are approximate measurements. It is further noted that dimensions may be altered in various embodiments. Described below are dimensions of two exemplary embodiments:

TABLE 1

| Diameter Dash | ØA | B | L | ØC | ØD | ØE | ØF | G |
|---|---|---|---|---|---|---|---|---|
| −5 | .212 | .085 | 2.50 | .320 | .258 | .155 | .1715-.1725 | .250 |
| −6 | .256 | .108 | 2.50 | .365 | .310 | .175 | .1970-.2000 | .360 |

| M | Grip | Shear Strength | Shear Strength | Tensile Strength (lbs.) | Installation hole size | Drill Size |
|---|---|---|---|---|---|---|
| .344 | .170-1.125 | 625 | 665 | 950 | .1645-.1665 | #20 |
| .375 | .375-1.250 | 875 | 1250 | 1650 | .1900-.1930 | #10 |

It is noted that embodiments may include various sizes and dimensions. For instance, for 3/32" (3 diameter), and 1/4" (8 diameter) rivets may be utilized in certain embodiments of the invention. The dimensions of these and other embodiments may be apparent through the aspects disclosed herein. Moreover, such dimensions may be exemplary and may represent general measurements. It is further noted that modifications of the dimensions are considered within the scope of this disclosure.

Turning to FIG. 6, there is a top view of the head 510 taken along reference line A-A of FIG. 5. The head 510 may comprise a number of cutouts 518 as describe herein. In at least one example, the head 510 comprises four equally spaced apparat cutouts 518. The cutouts 518 may be approximately four times the groove length of diameter ØA by 0.020 in. deep.

Figure 9:
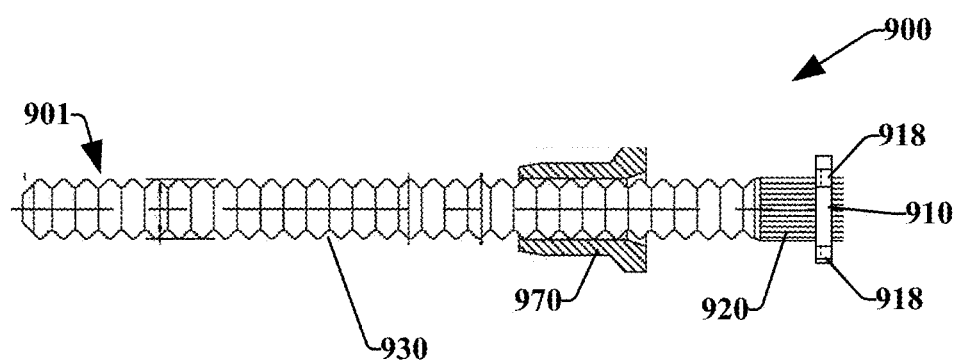
FIG. 9 is a side view of a tack rivet comprising a ring-like head with cutouts in accordance with embodiments disclosed herein.

[Referring now to FIG. 9, there is a tack rivet 900 in accordance with various disclosed embodiments. Tack rivet 900 generally includes a stem 901 and a collar 970. Stem 901 may include a head 910, insert portion 920, and a ribbed portion 930. It is noted that tack rivet 900 may include similar aspects as those described with reference to the other various figures.

The head 910 comprises a ring or frame-shaped protrusion or ledge generally circumscribing a section of the insert portion 920. As described herein, the head 910 may be sized and shaped such that it does not pass through an aperture formed in a work piece. As noted herein, the head 910 may comprise cutouts 918 formed therethrough. The cutouts 918 may go to a depth approximately equal or proximal to the insert portion 920. In other embodiments, the cutouts 918 may go less than all the way to the insert portion 920. It is noted that head 910 may comprise squared, rounded, chamfered, tapered, or other edges. Moreover, the head 910 may be integrally formed with the insert portion 920 and/or separately formed and affixed thereto.

Figure 10:
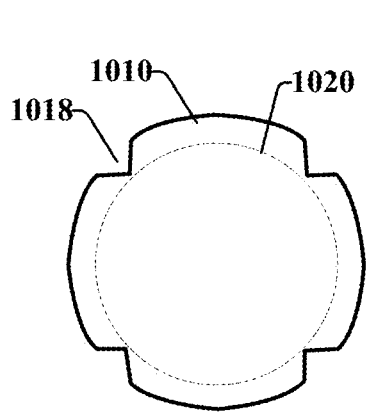
FIG. 10 is a top view of a tack rivet head comprising a V-shaped cutouts in accordance with embodiments disclosed herein.
Figure 11:
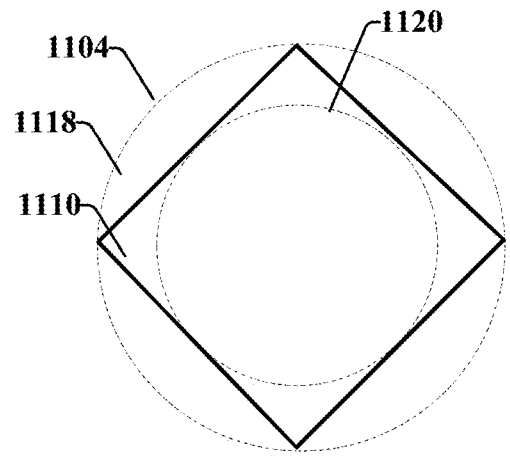
FIG. 11 is a top view of a tack rivet head comprising a square shape in accordance with embodiments disclosed herein.
Figure 12:
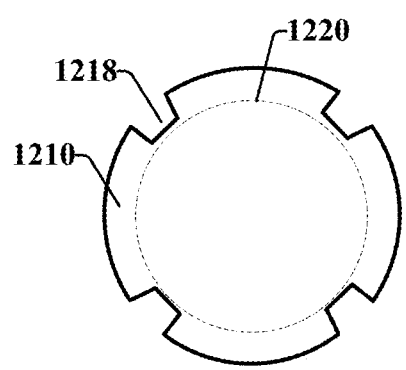
FIG. 12 is a top view of a tack rivet head comprising a rectangular-shaped cutout in accordance with embodiments disclosed herein.

Turning now to FIGS. 10-12, there are exemplary heads 1010, 1110, and 1210 respectively. It is noted that the heads 1010, 1110, and 1210 may be utilized with various disclosed embodiments (e.g., stem 100, tack rivet 500, tack rivet 900, etc.). Each of the heads 1010, 1110, and 1210 may comprise cutouts 1018, 1118, and 1218 respectively. The cutouts 1018, 1118, and 1218 may comprise various shapes, such as generally V-shaped, U-shaped, rectangular, or the like. The cutouts 1018, 1118, and 1218 may be cut to a depth such that their deepest point is approximately coplanar with a portion of the insert portions 1020, 1120, and 1220 respectively.

As shown in FIG. 11, head 1110 may be generally rectangular or diamond shaped. The dotted line 1104 illustrates a circle that generally contacts the corners of the head 1110 so that the cutout 1118 may be illustrated. It is noted that the cutout 1118 may be formed by cutting a circular head represented by 1104. In other embodiments, the head 1110 may be originally formed as shown and may not actually be cut. As such, a cutout may refer to a portion that has been physically cut or is otherwise not present.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tacking fastener for forming a hole for a permanent fastener, the tacking fastener comprising:
   a stem comprising:
      a first end comprising a head having transition portion terminating at a proximal edge of an insert portion;
      a second end; and
      a ribbed portion extending at least partially between a distal edge of the insert portion and the second end;
   wherein the insert portion disposed between the first end and the ribbed portion and having a diameter that is greater than a diameter of the ribbed portion but smaller than a diameter of the head; and
   a collar operatively attachable to the ribbed portion, said collar including an annular flange;
   wherein the head comprises three or more cutouts each having a vertex and extending axially through a periphery of the head and through the transition portion to a junction of the insert portion and wherein the cutouts comprise a depth such that a deepest portion of a cutout is generally coplanar with a portion of the insert portion.

2. The tacking fastener of claim 1, wherein the cutouts are equally spaced apart from each other.

3. The tacking fastener of claim 1, the head comprises four cutouts.

4. The tacking fastener of claim 1, the stem comprises an aluminum alloy.

5. The tacking fastener of claim 1, wherein the cutouts comprise partially cylindrical recesses.

6. The tacking fastener of claim 1, wherein the cutouts are generally cylindrical in shape.

7. The tacking fastener of claim 1, wherein the cutouts comprise at least one of a V-Shape, a U-shape, or a rectangular shape.

8. The tacking fastener of claim 1, wherein the head is integral with the insert portion.

9. The tacking fastener of claim 1, wherein the head is separate from the insert portion.

10. The tacking fastener of claim 1, wherein an end of the stem opposite the head is generally tapered.

* * * * *